United States Patent
Kunnathur Ragupathi et al.

(10) Patent No.: US 11,308,064 B2
(45) Date of Patent: Apr. 19, 2022

(54) SYSTEM AND METHOD FOR SUPPORTING SIMILAR THERMAL DEVICES

(71) Applicant: Dell Products L.P., Round Rock, TX (US)

(72) Inventors: Dinesh Kunnathur Ragupathi, Round Rock, TX (US); Akkiah Choudary Maddukuri, Austin, TX (US); Alaric Joaquim Narcissius Silveira, Austin, TX (US); Danny Daniel Whittington, Austin, TX (US); Arun Muthaiyan, Round Rock, TX (US); Venkatesh Ramamoorthy, Round Rock, TX (US); Carlos Guillermo Henry, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1215 days.

(21) Appl. No.: 15/197,103

(22) Filed: Jun. 29, 2016

(65) Prior Publication Data
US 2018/0004787 A1     Jan. 4, 2018

(51) Int. Cl.
G06F 16/22       (2019.01)
G06F 1/20         (2006.01)
G06F 16/2453   (2019.01)
G06F 16/2455   (2019.01)

(52) U.S. Cl.
CPC .......... *G06F 16/2282* (2019.01); *G06F 1/206* (2013.01); *G06F 16/2453* (2019.01); *G06F 16/2455* (2019.01); *Y02D 10/00* (2018.01)

(58) Field of Classification Search
CPC ............. G06F 16/2282; G06F 16/2455; G06F 16/2453; G06F 1/206; Y02D 10/16; Y02D 10/00
See application file for complete search history.

(56) References Cited

U.S. PATENT DOCUMENTS

| | | | | |
|---|---|---|---|---|
| 5,249,741 A * | 10/1993 | Bistline | .............. | G05D 23/1906 165/80.3 |
| 6,029,119 A * | 2/2000 | Atkinson | ........... | G05D 23/1917 702/132 |
| 6,212,585 B1 * | 4/2001 | Chrabaszcz | ............. | H04L 29/06 709/220 |
| 9,335,751 B1 * | 5/2016 | Farshchian | ........... | G06F 1/3206 |

(Continued)

*Primary Examiner* — Farley Abad
(74) *Attorney, Agent, or Firm* — Baker Botts L.L.P.

(57) ABSTRACT

Methods and systems for supporting similar thermal devices may involve collecting, by a thermal module on a management controller of an information handling system, device information about an add-in card, determining whether the add-in card was previously defined by matching the device against a table, searching the table based on the determination that the add-in card was not previously defined, determining whether the add-in card is supported by finding a match in the table, and applying a thermal tier associated with the match in the table based on the determination that the add-in card is supported. The device information collected may involve at least two of a reseller part number, description, device identifier, sub device identifier, vendor identifier, sub vendor identifier, slot identifier, lane width, and auxiliary power indicator. The search of the table may involve at least one of the description, lane width, and sub vendor identifier.

20 Claims, 4 Drawing Sheets

(56) References Cited

U.S. PATENT DOCUMENTS

| | | | |
|---|---|---|---|
| 10,143,107 B1* | 11/2018 | Zuo | H05K 7/20836 |
| 2002/0162013 A1* | 10/2002 | Burnett | G06F 21/6218 |
| | | | 726/27 |
| 2003/0074491 A1* | 4/2003 | Cepulis | G06F 9/4411 |
| | | | 710/2 |
| 2005/0060440 A1* | 3/2005 | Meynard | G06F 11/3065 |
| | | | 710/16 |
| 2009/0070512 A1* | 3/2009 | Narad | G06F 13/4081 |
| | | | 710/301 |
| 2009/0177334 A1* | 7/2009 | Artman | G06F 1/206 |
| | | | 700/300 |
| 2010/0095137 A1* | 4/2010 | Bieswanger | G06F 1/3296 |
| | | | 713/300 |
| 2010/0268975 A1* | 10/2010 | Bose | G06F 11/3006 |
| | | | 713/340 |
| 2011/0016342 A1* | 1/2011 | Rowan | G06F 11/3006 |
| | | | 713/340 |
| 2012/0084551 A1* | 4/2012 | Cheng | G06F 1/206 |
| | | | 713/2 |
| 2012/0154375 A1* | 6/2012 | Zhang | G06F 9/4411 |
| | | | 345/419 |
| 2014/0324904 A1* | 10/2014 | Yamamoto | G06F 16/245 |
| | | | 707/769 |
| 2015/0124580 A1* | 5/2015 | Rao | H04L 25/03 |
| | | | 370/216 |
| 2016/0091945 A1 | 3/2016 | Shabbir et al. | |
| 2018/0275955 A1* | 9/2018 | Appell | H03G 5/165 |

* cited by examiner

SYSTEM AND METHOD FOR SUPPORTING SIMILAR THERMAL DEVICES

BACKGROUND

Field of the Disclosure

This disclosure relates generally to information handling systems and more particularly to systems and methods for supporting similar thermal devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of management controllers in information handling systems has increased in recent years. Broadly speaking, a management controller may be a device, system, or apparatus for remote monitoring or management of an information handling system. A management controller may be enabled to use a so-called 'out-of-band' network interface that is physically isolated from an 'in-band' network interface used generally for non-management communications. The management controller may include, or be an integral part of, a baseboard management controller (BMC), a Dell Remote Access Controller (DRAC), or an Integrated Dell Remote Access Controller (iDRAC). The management controller may be a secondary information handling system embedded in the information handling system. This secondary information handling system, in the form of the management controller, may include a thermal module for managing the thermal configuration of the information handling system. The thermal module may have access to a table with configuration values corresponding to various components validated in the information handling system.

SUMMARY

A secondary information handling system, which may be in the form of a management controller, may include a lifecycle management functionality for various components of the information handling system, including hardware and software components. For hardware components, lifecycle management functionality may include a part replacement feature where newly introduced hardware components are automatically configured for use. In particular, when a new hardware component replaces a previous hardware component, the part replacement feature of the lifecycle management functions may perform an automatic firmware update in an effort to insure that the new hardware component operates in the same manner, and with the same device settings, as the previous hardware component. Such lifecycle management functionality, among other functions, may be provided by a lifecycle controller operating within an iDRAC, for example.

In management controllers having a thermal module, the thermal configuration of the information handling system may involve the identification and configuration of third-party add-in cards or devices. These devices may not have been validated with the information handling system. As a result, the thermal configuration may be overly conservative and the cooling system may operate at a higher cooling capacity than what is desirable. In this situation, the information handling system will function properly at the expense of additional costs to operate the cooling system at a higher capacity. Such a high cooling configuration may also serve as a nuisance due to excess noise. As a result, an information handling system supporting similar thermal devices may be desired.

The management controller may also provide the ability to override the cooling configuration to the user. The override interface may be implemented using low-level commands and require a user to decipher low-level data to configure cooling of the information handling system. Additionally, a user may not be able to configure the cooling system reliably, and the management controller may not be able to prevent unsafe configurations set by the user. Thus, easy-to-use interfaces to management controllers with protection against unsafe thermal configurations may be desired.

In one aspect, a disclosed method for supporting similar thermal devices includes collecting, by a thermal module on a management controller of an information handling system, device information about an add-in card. The device information may comprise at least two of: a reseller part number, a description, a device identifier, a sub device identifier, a vendor identifier, a sub vendor identifier, a slot identifier, a lane width, and an auxiliary power indicator. The method may include determining whether the add-in card was previously defined by matching the device information against a table, and searching the table based on the determination that the add-in card was not previously defined. The table may be searched for at least one of: the description, the lane width, and the sub vendor identifier of the device information. The method may include determining whether the add-in card is supported and applying a thermal tier. Support for the add-in card may be determined by finding a match in the table. The thermal tier may be associated with the match in the table and may be based on the determination that the add-in card is supported.

In certain embodiments, the method includes receiving a user input modifying the collected device information. The user input may be used to search the table and may modify at least one of: the description, the lane width, and the sub vendor identifier. In other embodiments, the method includes applying a default thermal tier based on a portion of the device information and a scaling factor associated with the portion.

Another disclosed aspect includes an information handling system, comprising a processor subsystem having access to a first memory, and a management controller comprising a secondary processor having access to a second memory, the second memory including an embedded storage partition and the second memory storing instructions executable by the secondary processor.

A further disclosed aspect includes a management controller for an information handling system having a primary processor and a primary memory, the management controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
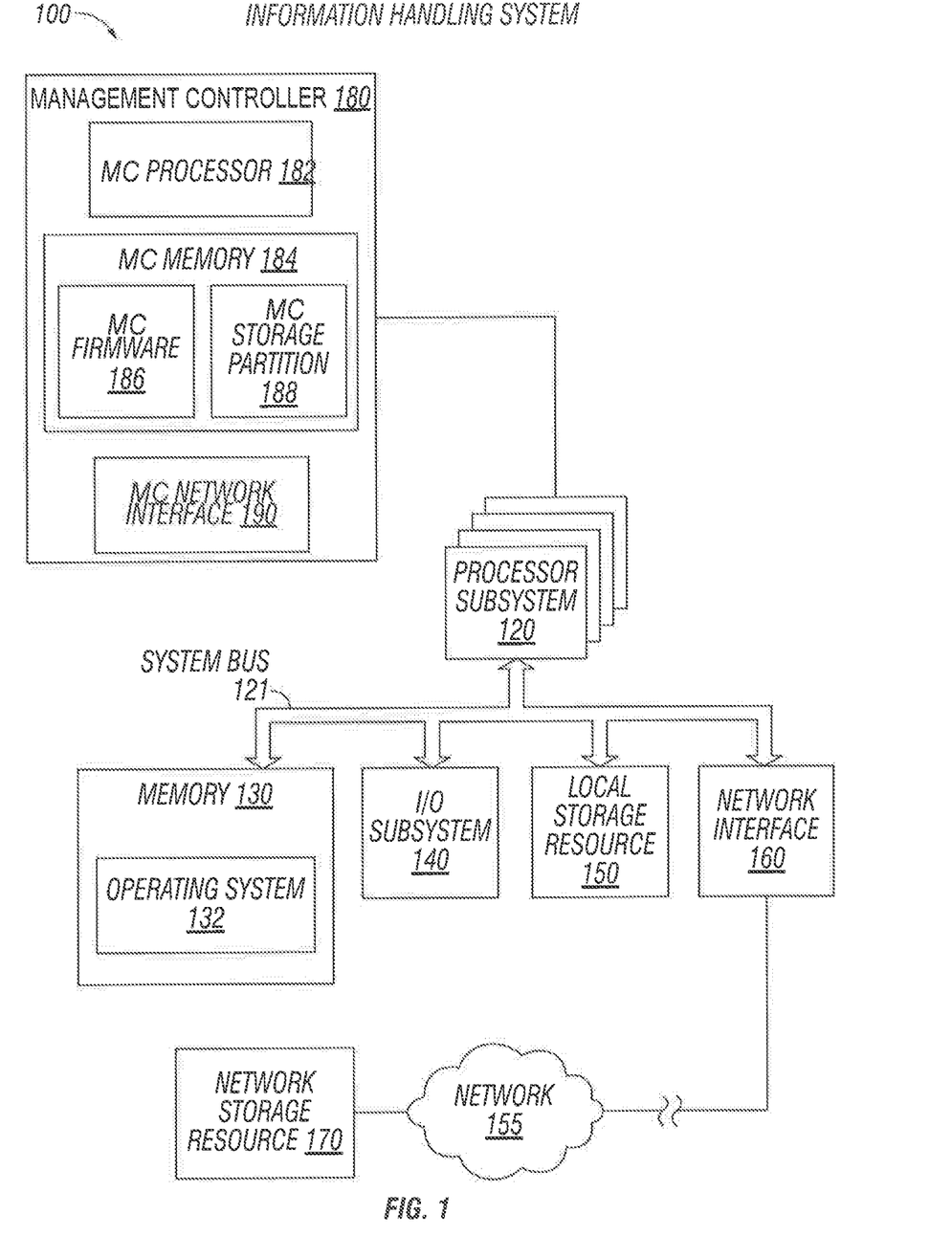
FIG. 1 is a block diagram of selected elements of an information handling system for supporting similar thermal devices, in accordance with some embodiments of the present disclosure.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC processor 182 may have access to MC memory 184, which may store MC firmware 186, representing instructions executable by MC processor 182. Also shown stored in MC memory 184 is MC storage partition 188, which may represent an embedded storage partition for management controller 180. MC firmware 186 may represent pre-boot instructions executable by MC processor 182, for example, for preparing information handling system 100 to boot by activating various hardware components in preparation of launching operating system 132 for execution (also referred to as a basic input/output system (BIOS)). In certain embodiments, MC firmware 186 includes a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide "out-of-band" network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of iDRAC while MC firmware 186 may include a lifecycle controller.

In operation, when information handling system 100 is powered on, booted, or rebooted (i.e., started or restarted), MC firmware 186 may perform a system inventory to discover a hardware component installed or updated on information handling system 100. The hardware component may be considered new on information handling system 100 when MC firmware 186 discovers the hardware component.

Management controller 180 may set a thermal configuration of the information handling system. The thermal configuration may be set by a thermal module with access to information about components in the information handling system. The thermal module may set the thermal configuration based on the information by configuring the thermal cooling subsystem of the information handling controller according to one or more requirements of one or more components. The thermal subsystem may include any suitable cooling, including but not limited to air cooling, water cooling, and/or refrigerant cooling. Optimal configuration of the thermal subsystem may result in energy savings, reduced noise, and/or improved efficiency for the information handling system. For example, the fan speed may be reduced to optimize the thermal subsystem and to save energy. If the information handling system operates in an environment with restricted energy consumption, such as a fixed maximum total energy consumption limit, an optimal configuration of the thermal subsystem may increase the amount of energy available to the processor subsystem, which may increase the performance of the information handling system. Management controller 180 may adjust the thermal configuration to accommodate the new hardware component. The thermal module may collect device information using MC firmware 186, which may include a BIOS, a UEFI, and/or a lifecycle controller. The collected device information may be used to configure the new hardware component, also known as a thermal device or an add-in card.

The new hardware component may not validated to operate in an efficient manner with the information handling system. As such, the thermal module may configure the information handling system to operate with a conservative thermal configuration using a high cooling capacity. This conservative approach ensures proper operation at the expense of increased operating cost. Thus, it may be desirable to ensure proper operation without increased operating costs. To achieve both benefits of efficient operation, management controller 180 may include a device similarity unit to determine whether a new hardware component is similar to a validated device.

Figure 2:
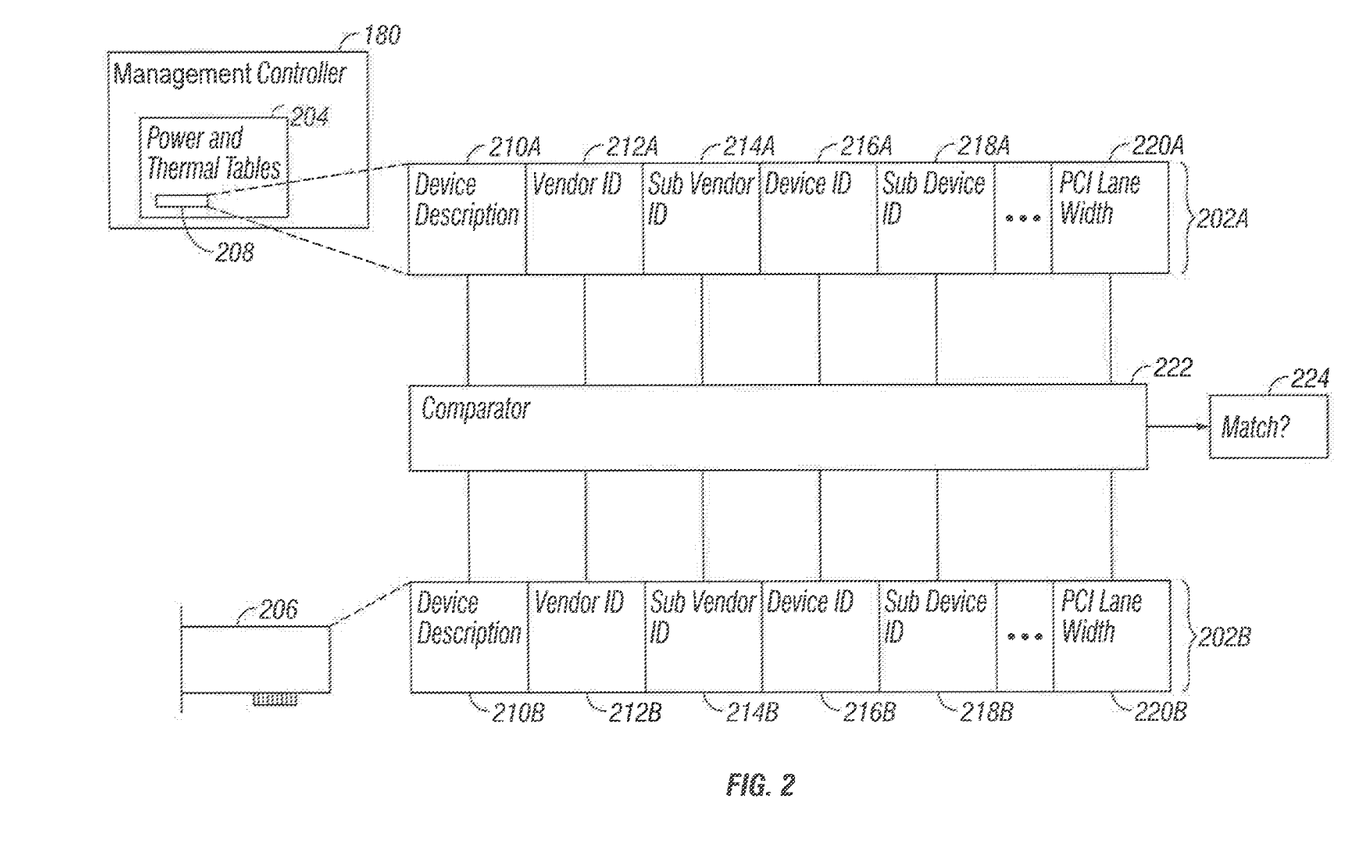
FIG. 2 is a block diagram of selected elements of an information handling system for determining whether a device was previously defined, in accordance with some embodiments the present disclosure.

Referring now to FIG. 2, a block diagram of selected elements of an information handling system for determining whether a device was previously defined is shown in accordance with some embodiments the present disclosure. An information handling system may include management controller 180 with power and thermal tables 204. Although power and thermal tables are shown, any combination of fixed and/or virtual tables may be used. For instance, a virtual table may combine aspects of both power and thermal tables, along with a user configurable portion. A fixed table may refer to either a thermal or power table. Table 204 may include an entry 208 for a particular device. The entry may include any suitable information for the device, including a device description 210A, a vendor identifier (ID) 212A, a sub vendor identifier (ID) 214A, a device identifier (ID) 216A, a sub device identifier (ID) 218A, and a PCI lane width 220A. Some information in each entry may be associated with the Peripheral Component Interconnect Express (PCI-E) specification, including the device ID 216A, and the vendor ID 212A.

To expand the options for configuring the information handling system thermal cooling, table 204 may include additional suitable fields, such as a scaling factor, reseller part number, a slot identifier (ID), a thermal tier, the power required by the device, the type of device, or an auxiliary power indicator. A device requiring auxiliary power, for example, may require a minimum amount of power and thermal cooling capability. A slot identifier may be used to optimize the thermal configuration for the dynamics of the cooling system. A scaling factor may be used to determine how much additional cooling may be needed for a particular type of device. For example, the vendor identifier for the add-in card may indicate that the card typically requires at least 100 Watts of power and/or thermal cooling capability. As another example, a PCI lane width of 16 lanes may indicate that the thermal device is a graphics card, which may require more than 200 Watts of power and/or thermal cooling capability.

The information handling system may have a thermal device or add-in card 206 with its own suitable information. The device information for the entry 202A and the device information for the add-in card 202B may be compared using comparator 222. Each piece of information may be input into comparator 222 to determine whether the entry matches the add-in card. The device may have been previously defined if a match 224 is found. Management controller 180 may use the thermal tier associated with the match to configure the new hardware component.

A thermal tier, also known as a boundary condition, may be a representation of the thermal cooling requirements for a device. For example, for air-cooled information handling systems the thermal tier may specify the air velocity in linear feet per minute (LFM) at a given local inlet temperature for a cooling fan. In one embodiment, the thermal tier may represent the maximum cooling requirements for the device. In another embodiment, the thermal tier may represent the minimum cooling requirements for the device. To facilitate discrete requirements, the thermal tiers may be numbered. For instance, thermal tiers 1 through 10 may correspond to increasing requirements in which thermal tier 10 generally requires more cooling than thermal tier 1. Although a greater thermal tier may correspond to a greater thermal requirement, any suitable relationship may be defined, including mapping a greater thermal tiers to reduced thermal requirements or associating each thermal tier with separate cooling requirement, such as the number of watts dissipated.

Adding cooling may be provided by any suitable cooling system, including air cooled systems and liquid cooling systems. For example, an air cooled system may increase the number of fans or the speed of the fans to add cooling. A thermal tier may be static, in which the cooling capability remains constant with the temperature of the information handling system or a component of the information handling system, or may be dynamic, in which the cooling capability increases as the temperature of the information handling system or a component of the information handling system increases.

Figure 3:
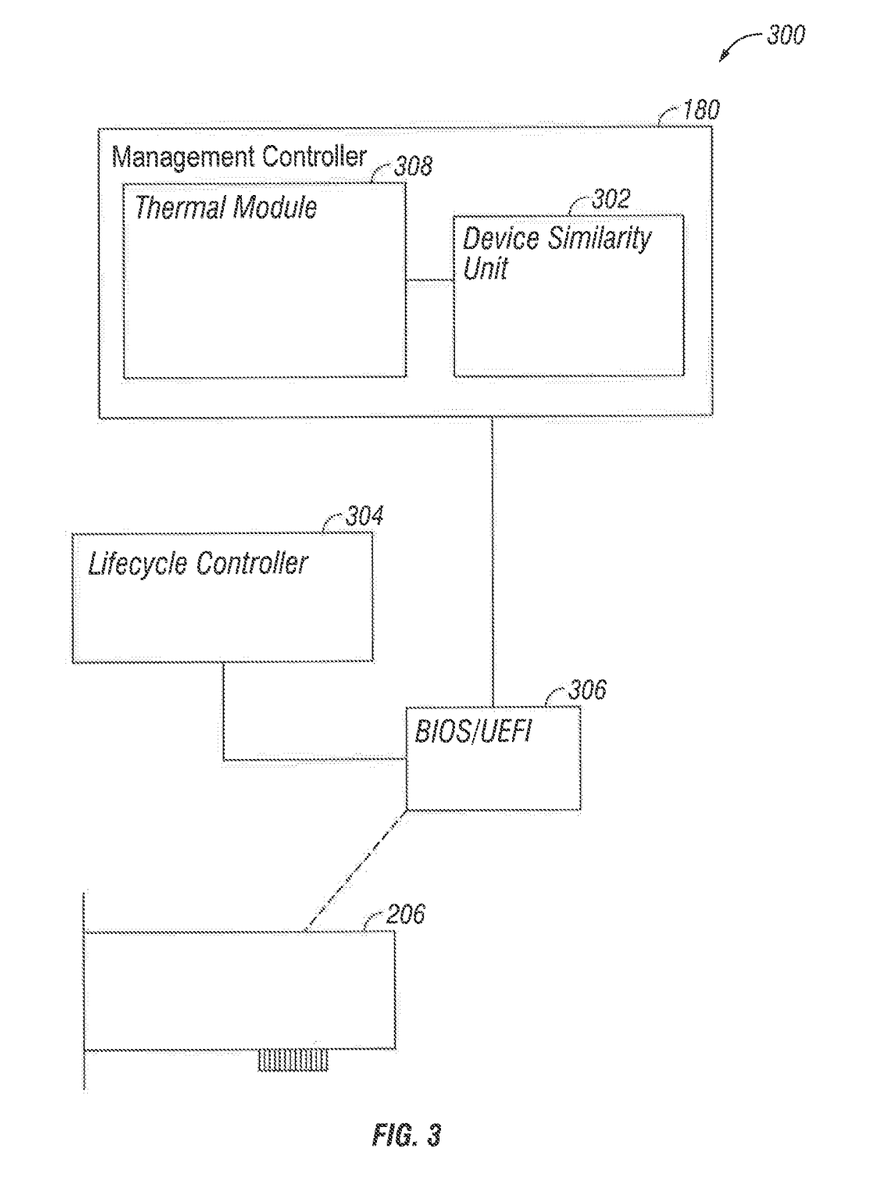
FIG. 3 is a block diagram of selected elements of an information handling system for thermal configuration using collected device information, in accordance with some embodiments the present disclosure.

Referring now to FIG. 3, a block diagram of selected elements of an information handling system for thermal configuration using collected device information is shown in accordance with some embodiments the present disclosure. Management controller 180 may include thermal module 308 and device similarity unit 302. Both thermal module 308 and device similarity unit 302 may access a table 204 within management controller 180. Thermal module 308 may collect information from a new hardware component using lifecycle controller 304 and BIOS/UEFI 306. BIOS/UEFI 306 may detect the new hardware component after it is installed, and may send the identifiers associated with the component to thermal module 308. The identifiers may include any suitable information used in device identification, including any PCI card identifier, such as vendor ID, device ID, sub vendor ID, or sub device ID. Lifecycle controller 308 may communicate with the component to obtain additional information such as the name of the device and/or the description of the device. Thermal module 308 may collect this information associated with the add-in card and access table 204 to find a matching entry, which may indicate that the device is supported.

If thermal module 308 does not find a matching entry, the device may not be supported with validated data, in which case thermal module 308 may determine a default configuration for the device using the device information. Thermal module 308 may use a scaling factor associated with the device to determine which thermal tier to use. The scaling factor may be embedded in table 204 or may be in a separate table indexed using a portion of the device's information. Any suitable portion of the device's information may be used, including the PCI lane width, the vendor ID, the device ID, or the auxiliary power indicator. Management controller 180 may then apply the scaled thermal configuration.

Device similarity unit 302 may optimize the thermal configuration further with either a manual or an automatic approach. A manual approach may receive user input for the device information or a portion of the device information.

The user input may amend or supplement the existing device information collected by thermal module 308. For example, the user may input a slot ID to indicate that the closest related card in the information handing system. Device similarity unit 302 may use the slot ID to locate the device in the identified slot, and then use that device information to locate the appropriate thermal tier. To prevent damage to the information handling system, the user may be prevented from inputting a specific thermal tier or a specific cooling system parameter, such as the fan speed.

An automatic approach may forgo user input and may attempt to determine the thermal configuration using a similar thermal device. Device similarity unit 302 may access table 204 to locate matching entries with the same portion of information as the new hardware component. Using this approach, a new hardware component may use the thermal configuration of a similar thermal device while possessing different device information. For example, if the devices share a common device description, PCI lane width, and/or PCI ID, a partially optimized thermal configuration may be used while minimizing the risk of damage to the information handling system. If device similarity unit 302 locates more than one match, the thermal tiers of the matches may be compared. If the thermal tiers are the same, the common thermal tier may be applied. Otherwise, if the thermal tiers are different, device similarity unit 302 may obtain the maximum thermal tier from the matching set and apply the maximum thermal tier. A maximum thermal tier may correspond to the thermal tier requiring the greatest cooling capability.

Device similarity unit 302 may present the recommended cooling configuration to a user and may let the user select an option. In this way, the user may still control the final thermal configuration applied to the information handling system without manually entering any values. Device similarity unit 302 may apply the similar thermal configuration by adding a soft link into table 204 or another table in management controller 180. The soft link may enable the new hardware component to update the thermal configuration when the information of the other device is updated. Thus, device similarity unit 302 may enable the thermal configuration to be dynamically updated without the need for subsequent user input or configuration.

Figure 4:
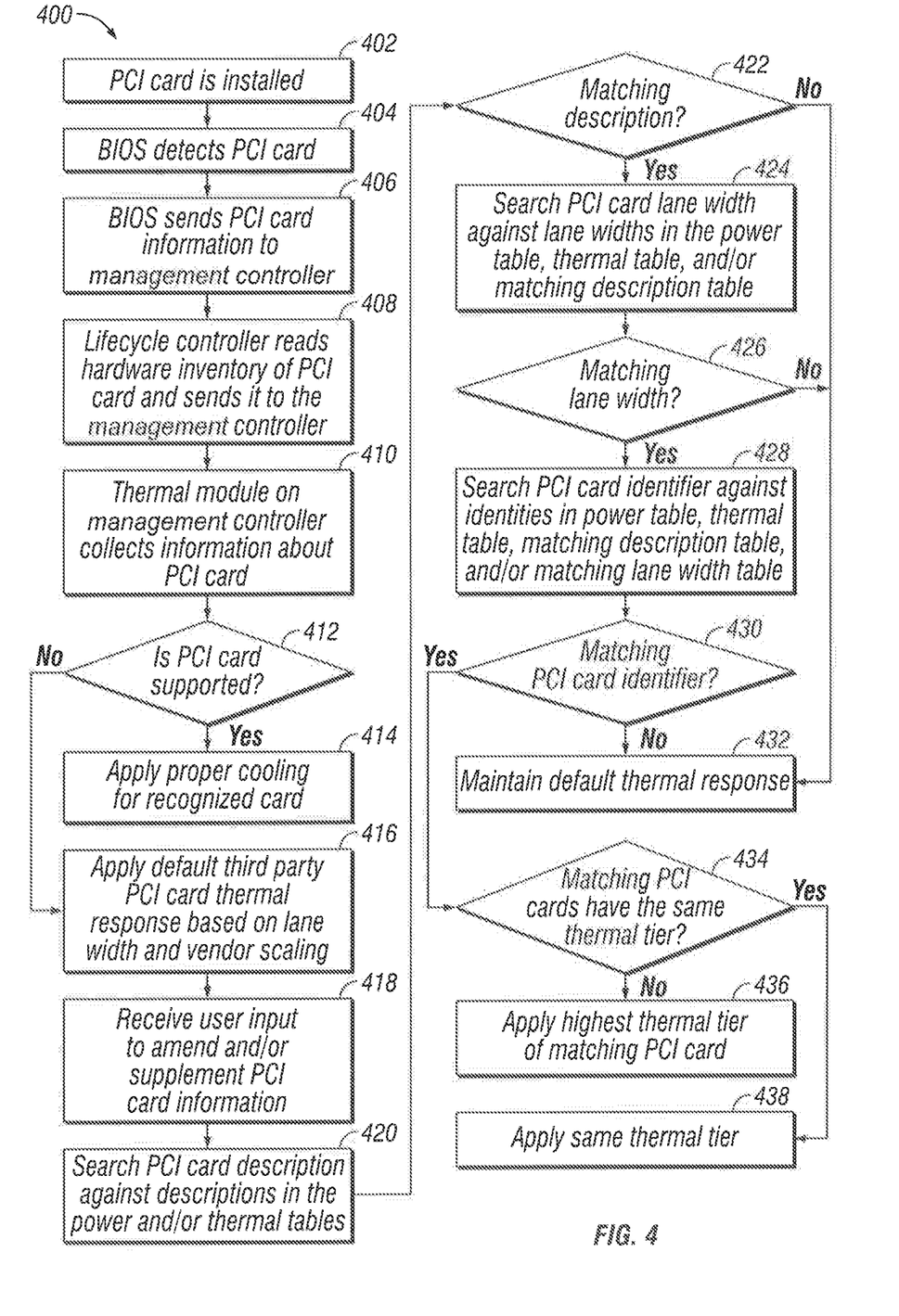
FIG. 4 is a flow chart depicting selected elements of a method for supporting similar thermal devices, in accordance with some embodiments the present disclosure.

Referring now to FIG. 4, a flow chart depicting selected elements of a method for supporting similar thermal devices is shown in accordance with some embodiments the present disclosure. Method 400 may be implemented by any of the elements shown in FIGS. 1-3. Method 400 may be initiated by any suitable criteria and may initiate operation at any suitable point. In one embodiment, method 400 may initiate operation at 402. Method 400 may include greater or fewer steps than those illustrated. Moreover, method 400 may execute its steps in an order that is different than those illustrated below. Method 400 may terminate at any suitable step. Moreover, method 400 may repeat operation at any suitable step. Portions of method 400 may be performed in parallel and repeat with respect to other portions of method 400.

At 402, a PCI card may be installed. The PCI card, also known as an add-in card, a thermal device, or a new hardware component, may be installed when the information handling system is powered off, or may be a hot-plug capable card. Although a PCI card is described here, any component capable of being installed by a user may be used. At 404, the BIOS may detect the PCI card. The BIOS may be a UEFI or any other suitable environment for communicating with hardware components of an information handling system. At 406, the BIOS may send information extracted from the PCI card to a management controller. The management controller may include a iDRAC to process to the information. The information may include any suitable data to assist in identifying the PCI card and/or the thermal profile of the PCI card, including but not limited to a reseller part number, a description, a PCI device ID, a PCI sub device ID, a PCI vendor ID, a PCI sub vendor ID, PCI lane width, an auxiliary power indicator, and/or the PCI card type.

At 408, the lifecycle controller may read the hardware inventory of the PCI card. The hardware inventory may include the PCI card name and/or description. The lifecycle controller may send the data read to the management controller for further processing. At 410, the thermal module on the management controller may collect information about the PCI card from the BIOS/UEFI and the lifecycle controller. The thermal module may reside within the management controller or may be a separate logic unit interfacing with the management controller.

At 412, the thermal module may determine whether the PCI card is supported by the management controller for thermal configuration. The determination may include checking the PCI IDs against one or more tables present on the management controller. The tables may be stored in the management controller memory, management controller firmware, and/or management controller storage partition. In one embodiment, the table may be a thermal table including information about PCI cards relevant for thermal configuration. In another embodiment, the table may be a power table including information about PCI cards relevant to power consumption, which may be related to the thermal configuration. In a further embodiment, the table may be a virtual table with information from multiple types of tables, such as both a thermal table and a power table. A virtual table may be created each time the management controller initiates operation. The check against the tables may include using a comparator to compare the information read from the device to the information present in the tables. The comparison may indicate a match if all the information read from the device is equivalent to all the information associated with an entry in the tables.

If the comparison indicates a match in the tables, method 400 may proceed to 414. Otherwise, method 400 may proceed to 416. At 414, the proper thermal configuration for the supported PCI card may be applied to the information handling system. Applying the configuration to the system may include inserting an additional entry to a table, or may include inserting a soft link to another entry in the table. At 416, method 400 may apply a default third-party PCI card thermal response or thermal configuration. The application of the default thermal configuration may be based on a portion of the device information, and a scaling factor associated with the portion. For instance, the portion may be the vendor ID, and the scaling factor may provide for increasing the thermal configuration, such as the fan speed, by 50% based on the vendor ID. The mapping of the portion to the scaling factor may be included in the tables in the management controller, or may be a separate table or map pairing together a key corresponding to the portion, to the value corresponding to the scaling factor.

At 418, user input may optionally be received to amend and/or supplement the PCI card information. A user may want to modify some of the PCI card information to correct for mismatches. A user may also forgo input and rely on the existing information. To prevent damage to the information handling system, the user may not be able to enter a thermal tier or fan speed directly. Instead, the user may be limited to entering information about the PCI card, including but not limited to the reseller part number, the PCI device ID, the PCI vendor ID, the PCI sub device ID, the PCI sub vendor ID, and/or the slot ID. The user may enter information related to the card closest or most similar to the add-in card being configured.

At 420, the device similarity unit may search the description of the PCI card against the descriptions in the tables. The device similarity unit may be included in the management controller or may be a separate logic unit. The device similarity unit may perform the search of the description by matching an entry in a table with a string value read from the card or entered by a user. Moreover, the device similarity unit may find more than one match in the table or tables. Rather than matching all of the information about the add-in card, as in step 412, the device similarity unit may limit the search to the description of the add-in card.

At 422, it may be determined whether there is a matching description in the table or tables. If a match is not found, method 400 may proceed to 432. Otherwise, if a match is found, method 400 may proceed to 424. At 424, the device similarity unit may search the lane width of the PCI card against the lane widths in the tables. In one embodiment, the search may be performed on one or more tables in the management controller. In another embodiment, the search may be performed only on the entries with matching descriptions to the description of the PCI card. The device similarity unit may perform the search of lane width by matching the numerical value read from the PCI card with an entry in a table.

At 426, it may be determined whether there is a matching lane width in the table or tables. If a match is not found, method 400 may proceed to 432. Otherwise, if a match is found, method 400 may proceed to 428. At 428, the device similarity unity may search the identifier of the PCI card against the identifiers in the tables. In one embodiment, the search may be performed on one or more tables in the management controller. In another embodiment, the search may be performed only on the entries with matching descriptions to the description of the PCI card. In a further embodiment, the search may be performed only on the entries with matching lane widths to the lane width of the PCI card. The device similarity unity may perform the search of the identifier by matching the numerical value read from the PCI card with an entry in the table. The match may involve any suitable combination of the identifier information, including but not limited to the device ID, vendor ID, sub device ID, and/or sub vendor ID. For instance, the match may involve the device ID and the vendor ID.

At 430, it may be determined whether there is a matching identifier in the table or tables. If a match if not found, method 400 may proceed to 432. Otherwise, if a match is found, method 400 may proceed to 434. At 432, the default thermal response may be maintained due to a mismatch in the description, lane width, or PCI card identifier. At 434, it may be determined whether the matching PCI cards or entries have the same thermal tier. If the matching cards have the same thermal tier, that common thermal tier may be applied to the thermal configuration at 438. Otherwise, if the matching cards have different thermal tiers, the device similarity unit may determine which thermal tier has the greatest thermal capability, or which thermal tier is the highest, and then may apply that thermal tier to the thermal configuration at 436. The application may involve inserting a hard-coded entry into the table, or may involve inserting a soft link into the table, which may link the PCI card being configured to another entry associated with another PCI card with similar thermal capabilities.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for supporting similar thermal devices, comprising:
   collecting, by a management controller of an information handling system, device information about an add-in card, wherein the device information comprises at least two of:
   a reseller part number;
   a device description;
   a device identifier;
   a sub device identifier;
   a vendor identifier;
   a sub vendor identifier;
   a slot identifier;
   a lane width; and
   an auxiliary power indicator;
   determining whether the add-in card was previously defined by matching the device information against a table;
   searching the table for at least one of: the device description, the lane width, and the sub vendor identifier of the device information based on the determination that the add-in card was not previously defined, wherein the device information does not match against the table, the search to obtain a match for a thermal device similar to the add-in card, the match found in the table for at least one of: the device description, the lane width, and the sub vendor identifier; and
   applying a thermal tier associated with the match for the similar thermal device, wherein the thermal tier is a boundary condition representing a thermal cooling requirement for the add-in card.

2. The method of claim 1, further comprising receiving a user input modifying the collected device information, and the step of searching the table further comprising searching using the user input modifying at least one of: the device description, the lane width, and the sub vendor identifier.

3. The method of claim 1, further comprising applying a default thermal tier based on a portion of the device information and a scaling factor associated with the portion.

4. The method of claim 1, wherein the step of applying a thermal tier further comprises:
   finding more than one match in the table;
   determining a maximum thermal tier based on a determination that the matches have different thermal tiers; and
   applying the maximum thermal tier.

5. The method of claim 1, further comprising:
   recommending the match found in the table to a user; and
   receiving a selection of the recommendation from the user, wherein the step of applying a thermal tier associated with the match further comprises applying the thermal tier associated with the selection.

6. The method of claim 1, wherein the step of applying a thermal tier further comprises creating a new entry in the table for the add-in card with a soft link to the match in the table.

7. An information handling system, comprising:
a processor subsystem having access to a first memory;
a management controller comprising a secondary processor having access to a second memory, the second memory including an embedded storage partition and the second memory storing instructions executable by the secondary processor to:
collect, by a thermal module on the management controller, device information about an add-in card, wherein the device information comprises at least two of:
a reseller part number;
a device description;
a device identifier;
a sub device identifier;
a vendor identifier;
a sub vendor identifier;
a slot identifier;
a lane width; and
an auxiliary power indicator;
determine whether the add-in card was previously defined, wherein the device information is matched against a table;
search the table for at least one of: the device description, the lane width, and the sub vendor identifier of the device information based on the determination that the add-in card was not previously defined, wherein the device information does not match against the table, the search to obtain a match for a thermal device similar to the add-in card, the match found in the table for at least one of: the device description, the lane width, and the sub vendor identifier; and
apply a thermal tier associated with the match for the similar thermal device, wherein the thermal tier is a boundary condition representing a thermal cooling requirement for the add-in card.

8. The information handling system of claim 7, further comprising instructions executable by the secondary processor to receive a user input to modify the collected device information, and the instructions to search the table further comprising instructions to search using the user input to modify at least one of: the device description, the lane width, and the sub vendor identifier.

9. The information handling system of claim 7, further comprising instructions executable by the secondary processor to apply a default thermal tier a portion of the device information and a scaling factor associated with the portion.

10. The information handling system of claim 7, wherein the instructions to apply a thermal tier further comprise instructions executable by the secondary processor to:
find more than one match in the table;
determine a maximum thermal tier based on a determination that the matches have different thermal tiers; and
apply the maximum thermal tier.

11. The information handling system of claim 7, further comprising instructions executable by the secondary processor to:
recommend the match found in the table to a user; and
receive a selection of the recommendation from the user, wherein the instructions to apply a thermal tier associated with the match further comprise instructions executable by the secondary processor to apply the thermal tier associated with the selection.

12. The information handling system of claim 7, wherein the instructions to apply a thermal tier further comprise instructions executable by the secondary processor to create a new entry in the table for the add-in card with a soft link to the match in the table.

13. The information handling system of claim 7, wherein the instructions to search the table search the table for the device description of the device information, and further comprising instructions executable by the secondary processor to:
determine whether the device description of the device information matches an entry in the table; and
search the table further for the lane width based on the determination that the device description matches an entry, wherein a match for the lane width is found in the table by matching the device description and the lane width.

14. A management controller for an information handling system having a primary processor and a primary memory, the management controller comprising:
a secondary processor having access to a second memory, the second memory including an embedded storage partition and the second memory storing instructions executable by the secondary processor to:
collect, by a thermal module on the management controller, device information about an add-in card, wherein the device information comprises at least two of:
a reseller part number;
a device description;
a device identifier;
a sub device identifier;
a vendor identifier;
a sub vendor identifier;
a slot identifier;
a lane width; and
an auxiliary power indicator;
determine whether the add-in card was previously defined, wherein the device information is matched against a table;
search the table for at least one of: the device description, the lane width, and the sub vendor identifier of the device information based on the determination that the add-in card was not previously defined, wherein the device information does not match against the table, the search to obtain a match for a thermal device similar to the add-in card, the match found in the table for at least one of: the device description, the lane width, and the sub vendor identifier; and
apply a thermal tier associated with the match for the similar thermal device, wherein the thermal tier is a boundary condition representing a thermal cooling requirement for the add-in card.

15. The management controller of claim 14, further comprising instructions executable by the secondary processor to receive a user input to modify the collected device information, and the instructions to search the table further comprising instructions to search using the user input to modify at least one of: the device description, the lane width, and the sub vendor identifier.

16. The management controller of claim 14, further comprising instructions executable by the secondary processor to apply a default thermal tier a portion of the device information and a scaling factor associated with the portion.

17. The management controller of claim 14, wherein the instructions to apply a thermal tier further comprise instructions executable by the secondary processor to:
find more than one match in the table;

determine a maximum thermal tier based on a determination that the matches have different thermal tiers; and apply the maximum thermal tier.

18. The management controller of claim 14, further comprising instructions executable by the secondary processor to:

recommend the match in the table to a user; and receive a selection of the recommendation from the user, wherein the instructions to apply a thermal tier associated with the match further comprise instructions executable by the secondary processor to apply the thermal tier associated with the selection.

19. The management controller of claim 14, wherein the instructions to apply a thermal tier further comprise instructions executable by the secondary processor to create a new entry in the table for the add-in card with a soft link to the match in the table.

20. The management controller of claim 14, wherein the instructions to search the table search the table for the device description of the device information, and further comprising instructions executable by the secondary processor to:

determine whether the device description of the device information matches an entry in the table; and search the table further for the lane width based on the determination that the device description matches an entry, wherein a match for the lane width is found in the table by matching the device description and the lane width.

* * * * *